United States Patent
Soneja et al.

(10) Patent No.: US 10,933,675 B2
(45) Date of Patent: Mar. 2, 2021

(54) ALUMINUM BASED SOLDERABLE CONTACT

(71) Applicants: TE Connectivity Corporation, Berwyn, PA (US); TE Connectivity Germany GmbH, Bensheim (DE); Tyco Electronics (Shanghai) Co. Ltd., Shanghai (CN)

(72) Inventors: Shallu Soneja, Fremont, CA (US); Gokce Gulsoy, Fremont, CA (US); Yiliang Wu, Fremont, CA (US); Xiao Zhou, Shanghai (CN); Helge Schmidt, Bensheim (DE); Soenke Sachs, Bensheim (DE); Felix Greiner, Bensheim (DE)

(73) Assignees: TE Connectivity Corporation, Berwyn, PA (US); TE Connectivity Germany GmbH, Bensheim (DE); Tyco Electronics (Shanghai) Co. Ltd., Shanghai (CN)

( * ) Notice: Subject to any disclaimer, the term of this patent is extended or adjusted under 35 U.S.C. 154(b) by 83 days.

(21) Appl. No.: 16/185,841

(22) Filed: Nov. 9, 2018

(65) Prior Publication Data
US 2019/0143726 A1    May 16, 2019

(30) Foreign Application Priority Data
Nov. 10, 2017    (CN) .......................... 201711103931.4

(51) Int. Cl.
*B23K 26/00*    (2014.01)
*B41M 3/00*    (2006.01)
(Continued)

(52) U.S. Cl.
CPC .......... *B41M 3/006* (2013.01); *B23K 1/0016* (2013.01); *B23K 1/0056* (2013.01); *B23K 1/19* (2013.01);
(Continued)

(58) Field of Classification Search
CPC . B41M 3/006; B23K 1/19; B23K 1/20; B23K 26/0006; B23K 3/0638; B23K 26/354; B23K 1/0056; B23K 1/0016; B23K 2103/08; B23K 2101/36–42; B23K 2103/10; B23K 35/025
(Continued)

(56) References Cited

U.S. PATENT DOCUMENTS 2,645,733 A * 7/1953 Marsal ................. H01R 39/045
                                                    310/235
3,497,951 A * 3/1970 Reighter ............... B23K 1/0004
                                                    29/879

(Continued)

FOREIGN PATENT DOCUMENTS

JP    02090529 A * 3/1990
JP    10242151 A * 9/1998

*Primary Examiner* — Kiley S Stoner
(74) *Attorney, Agent, or Firm* — Barley Snyder

(57) ABSTRACT

A method of producing a solderable aluminum contact comprises formulating an ink, applying the ink to an aluminum substrate to form an ink layer on a surface of the aluminum substrate, and melting the ink layer. The ink includes a solderable element that is conductive. The melting of the ink layer forms an alloy on the surface of the aluminum substrate including the solderable element.

18 Claims, 4 Drawing Sheets

(51) Int. Cl.
   *B23K 1/00*      (2006.01)
   *B23K 1/005*     (2006.01)
   *B23K 26/354*    (2014.01)
   *B23K 3/06*      (2006.01)
   *B23K 1/20*      (2006.01)
   *B23K 1/19*      (2006.01)
   *B23K 103/10*    (2006.01)
   *B23K 101/42*    (2006.01)
   *B23K 103/08*    (2006.01)

(52) U.S. Cl.
   CPC .............. *B23K 1/20* (2013.01); *B23K 3/0638* (2013.01); *B23K 26/0006* (2013.01); *B23K 26/354* (2015.10); *B23K 2101/42* (2018.08); *B23K 2103/08* (2018.08); *B23K 2103/10* (2018.08)

(58) Field of Classification Search
   USPC .................. 228/179.1–180.22, 248.1–248.5; 148/23–24; 257/734–736; 438/597–688
   See application file for complete search history.

(56) References Cited

U.S. PATENT DOCUMENTS

| | | | | |
|---|---|---|---|---|
| 3,846,743 A * | 11/1974 | Garver | ................. | H01R 12/526 439/876 |
| 3,963,316 A * | 6/1976 | Williams | ............... | H01R 12/58 439/82 |
| 4,655,164 A * | 4/1987 | Nelson | ............. | H01L 21/67121 118/503 |
| 4,845,396 A * | 7/1989 | Huber | .................... | H02K 5/148 310/239 |
| 5,178,685 A * | 1/1993 | Borenstein | ...... | H01L 31/022425 136/244 |
| 5,250,770 A * | 10/1993 | Cummings | .......... | B60H 1/0065 200/295 |
| 5,449,108 A * | 9/1995 | Park | ........................ | H01L 24/11 228/103 |
| 5,468,655 A * | 11/1995 | Greer | ................. | G01R 1/07314 228/180.22 |
| 5,579,573 A * | 12/1996 | Baker | .................... | H01L 21/563 174/259 |
| 5,611,481 A * | 3/1997 | Akamatsu | .............. | B23K 35/26 228/180.22 |
| 5,722,160 A * | 3/1998 | Uemura | .................. | H01L 24/73 228/180.1 |
| 6,028,011 A * | 2/2000 | Takase | .................... | H01L 24/03 257/E23.021 |
| 6,028,357 A * | 2/2000 | Moriyama | .............. | H01L 23/24 257/737 |
| 9,834,470 B1 * | 12/2017 | Hilali | ..................... | C03C 3/122 |
| 2002/0000462 A1 * | 1/2002 | Mead | ................... | B23K 1/0053 228/248.1 |
| 2002/0046627 A1 * | 4/2002 | Amita | ................ | B23K 35/0244 75/252 |
| 2002/0179695 A1 * | 12/2002 | Sakai | ................... | H05K 3/1233 228/245 |
| 2003/0000571 A1 * | 1/2003 | Wakuda | ................ | H01L 31/048 136/256 |
| 2003/0213384 A1 * | 11/2003 | Su | ............................ | B41N 1/24 101/127 |
| 2004/0035917 A1 * | 2/2004 | Koopmans | ........... | B23K 1/0016 228/215 |
| 2004/0104261 A1 * | 6/2004 | Sterrett | .................. | H01L 24/11 228/180.22 |
| 2007/0176267 A1 * | 8/2007 | Abbott | ................. | H01L 21/561 257/666 |
| 2008/0001288 A1 * | 1/2008 | Sogawa | .................. | H01L 24/03 257/734 |
| 2008/0308892 A1 * | 12/2008 | Wildpanner | .... | H01L 31/022425 257/453 |
| 2009/0008431 A1 * | 1/2009 | Zonvide | ............... | H05K 9/0015 228/179.1 |
| 2010/0116310 A1 * | 5/2010 | Shimizu | .................. | H01L 31/05 136/244 |
| 2011/0197960 A1 * | 8/2011 | Pham | .............. | H01L 31/022425 136/256 |
| 2012/0222738 A1 * | 9/2012 | Oh | .......................... | H01B 1/22 136/256 |
| 2013/0186875 A1 * | 7/2013 | Lisinski | ............ | B32B 17/10192 219/203 |
| 2014/0042624 A1 * | 2/2014 | Zommer | .......... | H01L 23/49524 257/741 |
| 2014/0065757 A1 * | 3/2014 | Yi | ..................... | H01L 21/02054 438/71 |
| 2014/0230885 A1 * | 8/2014 | Fyson | ................ | G08B 13/1409 136/251 |
| 2014/0272543 A1 * | 9/2014 | Devan | ................. | H01M 2/1653 429/162 |
| 2014/0347766 A1 * | 11/2014 | Biskeborn | ................ | G11B 5/40 360/323 |
| 2015/0364615 A1 * | 12/2015 | Rogojina | ............ | H01L 31/0224 136/256 |
| 2016/0062127 A1 * | 3/2016 | Gittler | ................... | G01J 5/0875 359/894 |
| 2016/0108254 A1 * | 4/2016 | Koyama | .................. | C09D 5/24 257/753 |
| 2016/0340519 A1 * | 11/2016 | Yang | ........................ | C09D 5/24 |
| 2017/0287861 A1 * | 10/2017 | Yamada | ...................... | C22C 9/00 |
| 2018/0013023 A1 * | 1/2018 | Moslehi | .................. | H01L 31/044 |
| 2018/0205163 A1 * | 7/2018 | Sorig | ...................... | H01R 12/585 |
| 2018/0269135 A1 * | 9/2018 | Shibuya | ............... | H01L 21/4842 |
| 2019/0295934 A1 * | 9/2019 | Crema | ................. | H01L 23/49555 |

* cited by examiner

ALUMINUM BASED SOLDERABLE CONTACT

CROSS-REFERENCE TO RELATED APPLICATION

This application claims the benefit of the filing date under 35 U.S.C. § 119(a)-(d) of Chinese Patent Application No. 201711103931.4, filed on Nov. 10, 2017.

FIELD OF THE INVENTION

The present invention relates to an electrical contact and, more particularly, to an aluminum based solderable contact.

BACKGROUND

High current battery powered devices commonly use bus bars to electrically couple one or more battery cells to a circuit board. The bus bar may be a copper-clad aluminum strip. Aluminum is used due to its lower overall cost and weight and the copper-cladding is used to facilitate soldering the bus bar to the circuit board. It is difficult to make a reliable electrical and mechanical connection with pure aluminum as, for example, tenacious and fast-recovering oxides, high thermal conductivity, and other properties associated with aluminum make it difficult to solder.

During the cladding process, the copper and aluminum are thoroughly cleaned to remove any oxidation. The materials are then compressed together. The copper and aluminum, for example, may be passed through a pair of rollers under sufficient pressure to bond the layers. The pressure is high enough to deform the copper and aluminum and reduce the combined thickness of the clad material. Unfortunately, the cladding process is relatively time consuming and expensive, which leads to increased cost for devices that use bus bars.

SUMMARY

A method of producing a solderable aluminum contact comprises formulating an ink, applying the ink to an aluminum substrate to form an ink layer on a surface of the aluminum substrate, and melting the ink layer. The ink includes a solderable element that is conductive. The melting of the ink layer forms an alloy on the surface of the aluminum substrate including the solderable element.

BRIEF DESCRIPTION OF THE DRAWINGS

The invention will now be described by way of example with reference to the accompanying Figures, of which.

DETAILED DESCRIPTION OF THE EMBODIMENT(S)

Figure 1:
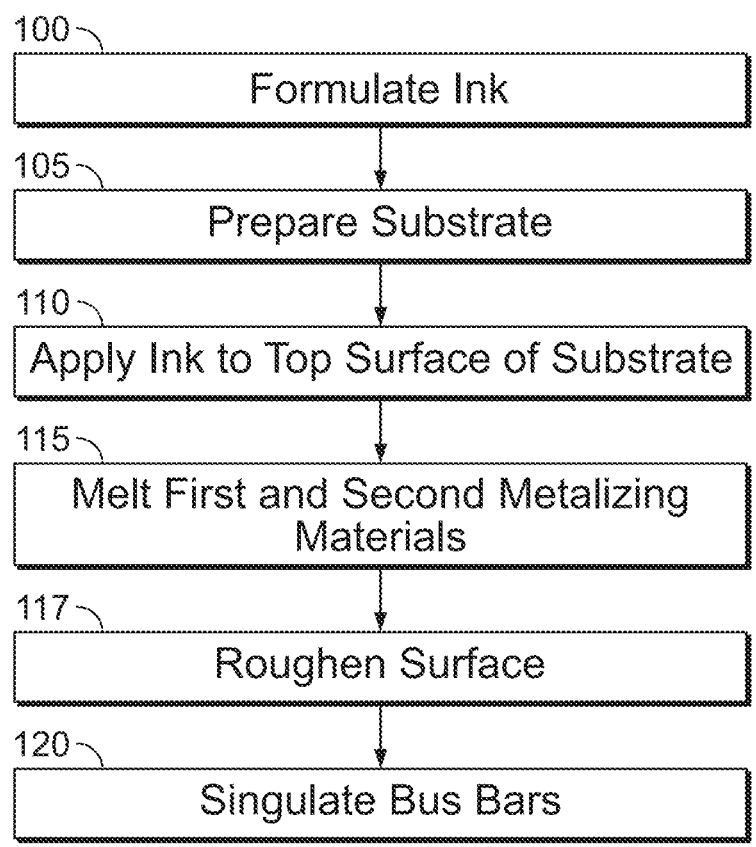
FIG. 1 is a block diagram of a process for producing an aluminum based solderable contact.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

A process for producing an aluminum based solderable contact is shown in FIG. 1. The process will be described with reference to a solderable contact 200 shown in FIGS. 2A and 2B.

Figure 2A:
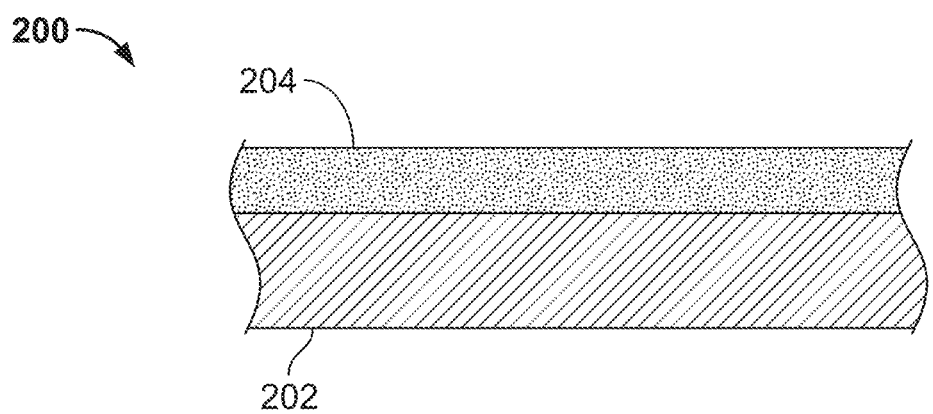
FIG. 2A is a sectional side view of the aluminum based solderable contact.
Figure 2B:
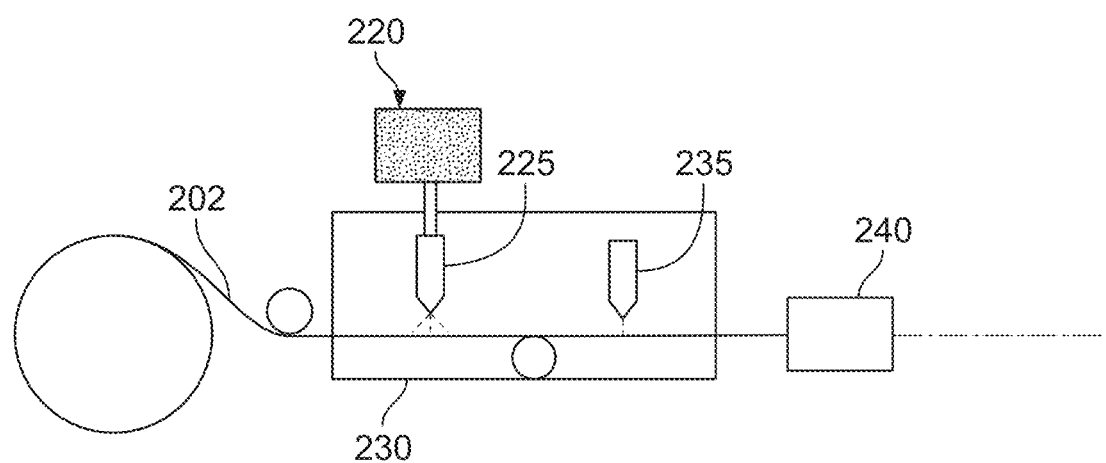
FIG. 2B is a schematic diagram of equipment and operations for manufacturing the aluminum based solderable contact.

At block 100 shown in FIG. 1, an ink 220 shown in FIG. 2B, which will eventually form a solderable surface of the contact 200, is formulated. The ink 220 includes one or more solderable elements held together with a binder and/or solvents. In various embodiments, the elements may be solderable elements such as tin (Sn), silver (Ag), zinc (Zn), copper (Cu), magnesium (Mg), palladium (Pd), nickel (Ni), silver/copper alloy, silver/tin alloy, or a different solderable element and any combination thereof. In exemplary embodiments, the solderable elements are silver/copper alloy or silver/tin alloy.

At block 105 shown in FIG. 1, an aluminum substrate 202, which will eventually correspond to a core of the contact 200, is prepared. The aluminum substrate 202 may be on a reel, as shown in FIG. 2B. In various embodiments, the aluminum substrate 202 has a thickness in a range of about 0.1 mm to 8 mm, or a range of about 0.2 to 5 mm. Aluminum is chosen due to its electrical and thermal performance. Aluminum has relatively high conductivity, low density, high thermal conductivity, and/or low work function. However, it is challenging to form a permanent aluminum contact due to its relatively poor solderability. Relatively pure aluminum compositions (99% or higher) are the most solderable and aluminum alloys with copper (Cu), manganese (Mn), and zinc (Zn) are reasonably solderable. Aluminum alloys with magnesium (Mg) and silicon (Si) are the least solderable.

At block 110 shown in FIG. 1, the ink 220 is applied to a surface of the aluminum substrate 202, forming an ink layer 204 on the surface as shown in FIG. 2A. In an embodiment, the ink 220 is applied by a printer 225 shown in FIG. 2B. In various embodiments, the ink layer 204 may be formed by printing the ink 220 using a screen printing process, gravure printing process, flexographic printing process, inkjet printing process, stencil printing process, pad printing process, or a different printing process. In some embodiments, the ink 220 may be applied to the aluminum substrate 202 within a vacuum chamber or an inert atmosphere 230, as shown in FIG. 2B, to reduce the amount of oxide build-up that may occur between processing of the aluminum substrate 202 and the application of the ink 220.

At block 115 shown in FIG. 1, the ink layer 204 is melted onto the substrate 202 via an energetic beam apparatus 235 shown in FIG. 2B configured to generate a focused beam of energy for melting the ink layer 204 at a precise location. In various embodiments, the energetic beam apparatus 235 may be used to apply a continuous energetic beam (for example, from a CO2 laser or electron beam welder), apply a pulsed energetic beam (for example, from a neodymium yttrium aluminum garnet laser), apply a focused beam, apply a defocused beam, or perform any other suitable beam-based technique. The energy of the electrons/beam voltage may be set to ensure a minimum penetration depth equal to a thicknesses of the ink layer 204. In an embodiment, the voltage-penetration depth is adjusted according to the following equation:

$$6.7 \times 10^{-7} \times \frac{V^{5/3}[V]}{\rho[g/cc]} \quad \text{(Eqn. 1)}$$

where V is voltage and p is density. The beam voltage may range between 1 kV-10 kV, 5 kV-25 kV, 20 kV-60 kV, 55 kV-100 kV, 85 kV-150 kV.

The beam power (voltage×current) and the beam dwell time are set to ensure that the ink layer 204 melts uniformly and that the heat dissipation through the aluminum substrate 202 is overcome. The dwell time corresponds to the amount of time the beam is directed at one spot and is different from the time it takes to entirely melt the ink layer 204. The beam power may range between 5-30 W, 25-100 W, 50-250 W, 100-1000 W, 500-2500 W, 1000-5000 W. The dwell time may range between 1-10 μS, 4-100 μs, 50-250 μs, 100-1000 μs, 0.5-10 μs, and 5-50 μs, or a different range.

Figure 3A:
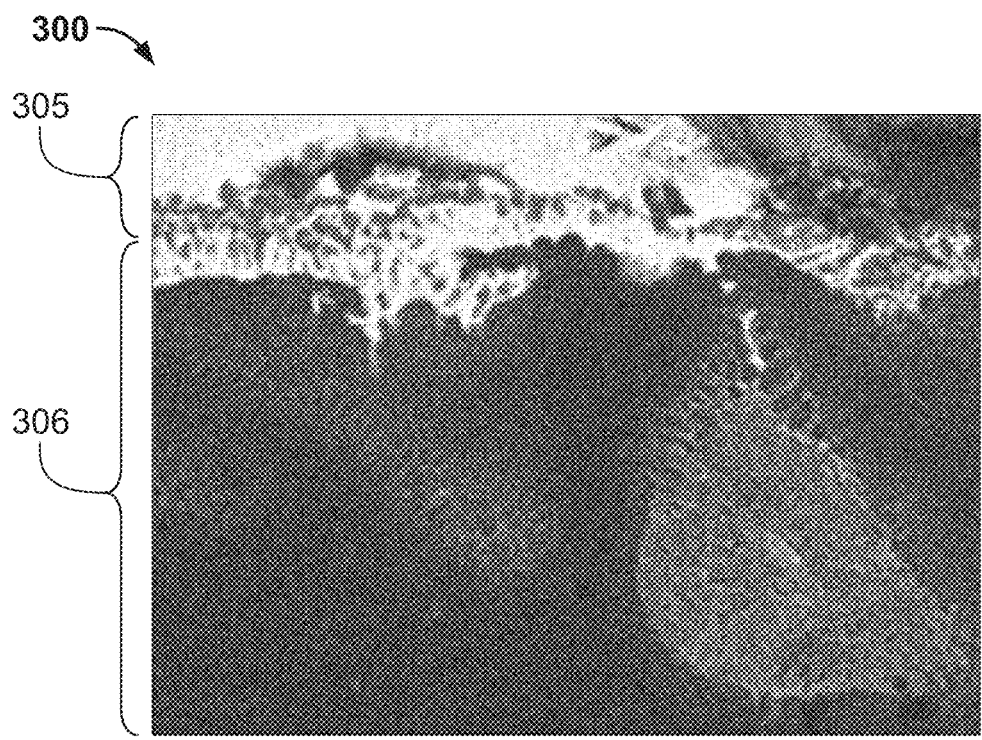
FIG. 3A is a sectional image of the aluminum based solderable contact.

During the melting, a thermoplastic material in the ink 220 may be burned away. In addition, a native oxide layer on the aluminum substrate 202 may be broken down by the energetic beam and/or dissolved by the weld pool (i.e., the melted ink layer 204). When broken down, the native oxide layer is no longer a macroscopically continuous layer. Removal of or breaking down the oxidation layer promotes strong adhesion between the material in the ink layer 204 and the aluminum substrate 202. Removal of or breaking down the native aluminum oxide layer also reduces contact resistance when forming a joint. This is different from other conventional processes such as electroplating or dip coating which may not be able to break down the oxide layer. FIG. 3A shows a cross-section 300 of the contact after melting. The ink layer 305 corresponds to a copper/silver (CuAg) ink layer melted on top of an aluminum substrate 306.

In an embodiment, although not necessarily required, a flux material may be introduced into the ink 220 to reduce tenacious native oxide layers such as aluminum oxide from forming between the ink layer 204 and the aluminum substrate 202, to thereby improve adhesion. The flux material may be added to the ink 220 prior to application to the aluminum substrate 202 or applied to the aluminum substrate 202 beforehand, for example as a first layer before printing of the ink 220. In various embodiments, the flux is an organic amine based flux, inorganic chloride/fluoride based flux, fluoroaluminate based flux, an acid based flux, or a different flux.

In some embodiments, in addition to the use of flux, the surface of the aluminum substrate 202 may be processed to remove any excess oxidation by mechanical means either in an inert gas atmosphere or in a vacuum. For example, these mechanical means include but are not limited to grinding, wire brushing, sand blasting, shot peening, and/or by other similar methods.

Subsequent to melting, the surface of the substrate 202 includes intermetallic elements corresponding to the materials in the ink layer 204 and the substrate 202; the melting forms an alloy on the surface of the substrate 202 including the one or more solderable elements. These intermetallic elements improve wetting and adhesion of low temperature tin (Sn) based solders.

Figure 3B:
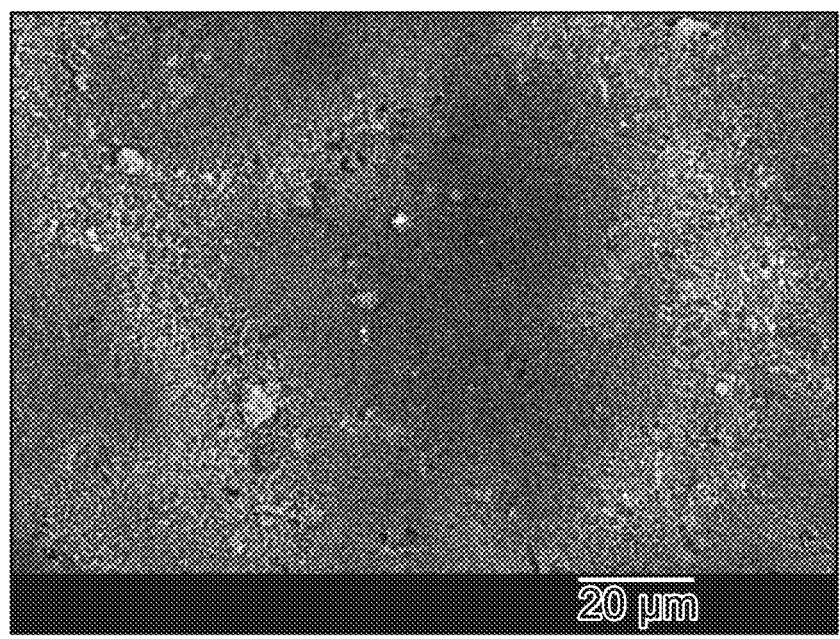
FIG. 3B is a top image of a surface of the aluminum based solderable contact.

At block 117 in FIG. 1, in some embodiments, the surface of the aluminum substrate 202 with the welded ink layer 204 is roughened, as shown in FIG. 3B, to provide a textured surface topography that promotes stronger adhesion to soldering materials. For example, as described above, grinding, wire brushing, sand blasting, shot peening and other similar methods may be used to roughen the surface. In some embodiments, the surface may be roughened via energetic beam melting.

At block 120 shown in FIG. 1, a singulator 240 shown in FIG. 2B cuts the roll of aluminum substrate 202 with the welded ink layer 204 on top into individual contacts 200.

The solderable aluminum contact 200 can be used to form a joint with itself or with a second substrate. In an embodiment, the second substrate is a material comprising one of: copper (Cu), aluminum (Al), tin (Sn), gold (Au), nickel plated copper, silver plated copper, a silver plated polymeric material, a gold plated polymeric material, and a combination thereof. Any suitable solder pastes can be used to form a joint including the solderable aluminum contact 200. In various embodiments, the solder paste can be selected from the list of alloys consisting of: SnPb, SnSb, SnBi, SnCuAg (SAC alloys), SnCuNi (SN100C) SnCu, SnAg, SnZn, SnAgPb, SnAgSb, SnIn, AuGe, and AuIn. In other embodiments, the solderable aluminum contact 200 enables the use of common solders such as low temperature lead-free solders to form a solder joint.

In other embodiments, any suitable conductive adhesive can be used to form a joint comprising the aluminum contact 200. In various embodiments, the conductive adhesive is selected from the list of adhesives consisting of: epoxy, cyanoacrylate, polyurethane, acrylic, or silicone with filler materials comprising silver (Ag), tin (Sn), copper (Cu), gold (Au), nickel (Ni) or a combination thereof.

The conductive adhesive or solder paste is heated to form a joint between the contact 200 and the second substrate. In an embodiment, the joint is a fluxless joint.

The contact 200 made according to the process shown in FIG. 1 and described above has several advantages over traditionally manufactured contacts. The solderability of the aluminum surface is improved when compared to a solid aluminum contact because the surface of the aluminum is alloyed with solderable materials, which facilitates soldering, for example, with tin (Sn) based solder paste/wire. The strength of a solder joint between the contact 200 and, for example, a second substrate made of a metal material has a shear strength greater than 3 MPa as measured according to ASTM D-1002.

Figure 4:
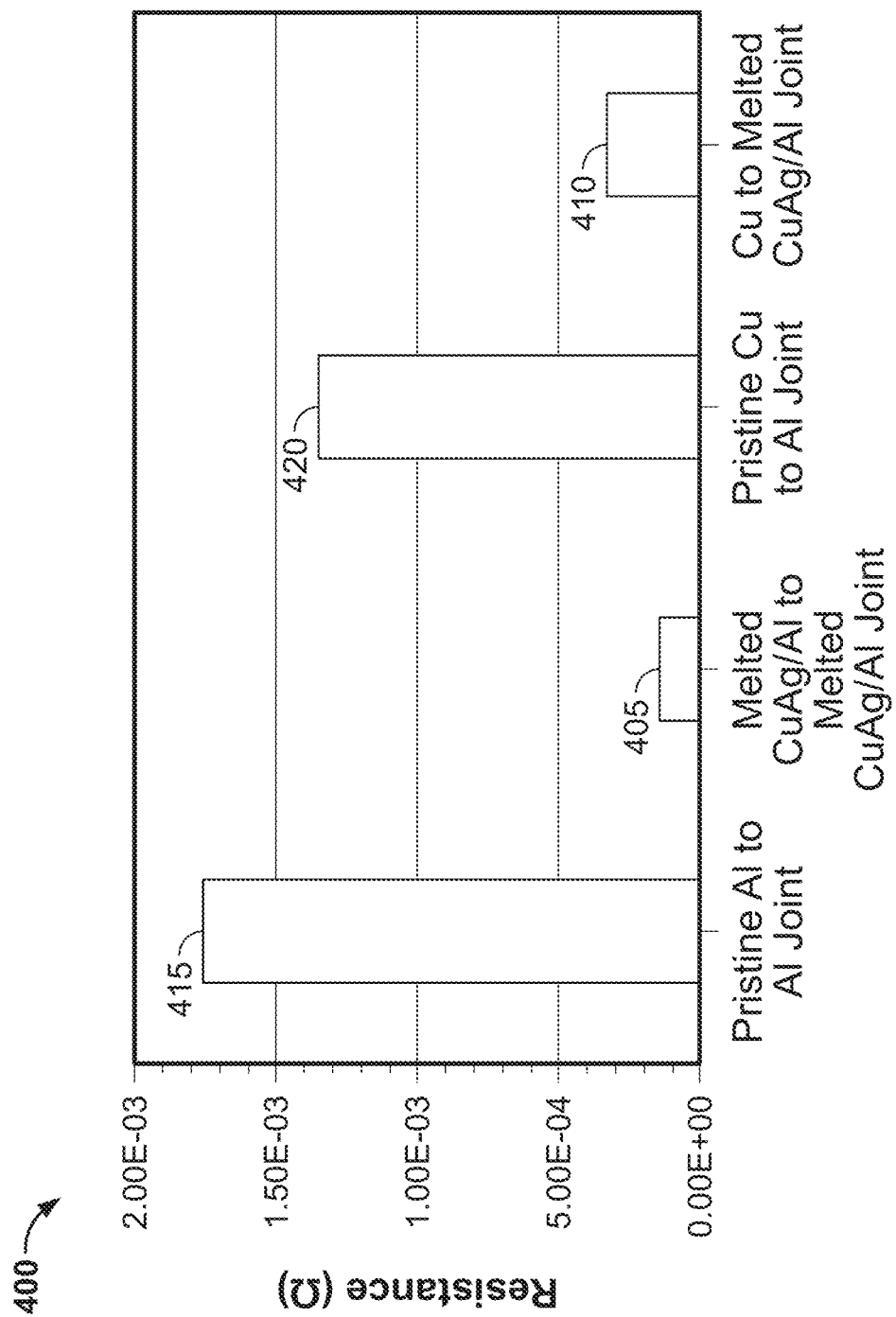
FIG. 4 is a bar chart of a comparison of joint resistance values for a plurality of joints between different substrates.

The contact 200 also has improved electrical properties. The solderable contact 200 has a joint resistance less than 1 milliohm, and in some embodiments less than 0.1 milliohm, when soldered to other metal components. As shown in the chart 400 of FIG. 4, the joint resistance 405 between two contacts formed over an area of 7.6×7.6 mm² with a copper/silver alloy layer on an aluminum substrate is less than 0.5 milliohms. The joint resistance 410 between a contact formed over an area of 7.6×7.6 mm² with a copper/silver alloy layer on an aluminum substrate and a copper contact is also less than 0.5 milliohms. On the other hand, the joint resistance 415 between two aluminum contacts over an area of 7.6×7.6 mm² is over 1.5 milliohms and the joint resistance 420 between an aluminum contact and a copper contact over an area of 7.6×7.6 mm² is greater than 1 milliohm. The joint resistance between the aluminum with the surface alloy and the second substrate is generally at least 75 percent less than that between pristine (i.e. uncoated) aluminum and the second substrate. In some embodiments, a copper/silver alloy layer on an aluminum substrate reduced the joint resistance by 90 percent or more. In other embodiments, a copper/silver alloy layer on an aluminum substrate reduced the joint resistance by 75 percent or more.

The aluminum based solderable contact 200 improves solderability, conductivity, and cost when compared to traditionally manufactured copper clad aluminum contacts. While the aluminum based solderable contact 200 has been described above with reference to certain embodiments, it will be understood by those skilled in the art that various changes may be made and equivalents may be substituted without departing from the spirit and scope of the claims of the application. Various modifications may be made to adapt a particular situation or material to the teachings disclosed above without departing from the scope of the claims. Therefore, the claims should not be construed as being limited to any one of the particular embodiments disclosed, but to any embodiments that fall within the scope of the claims.

What is claimed is:

1. A method of producing a solderable aluminum contact, comprising:
    formulating an ink that includes a solderable element that is conductive;
    applying the ink to an aluminum substrate to form an ink layer on a surface of the aluminum substrate;
    melting the ink layer with an energetic beam to form an alloy on the surface of the aluminum substrate including the solderable element, a beam power of the energetic beam is selected to burn away a thermoplastic material within the ink and break down an oxide layer on the aluminum substrate such that the oxide layer is no longer a macroscopically continuous layer; and
    cutting the aluminum substrate and the alloy into a plurality of individual contacts.

2. The method of claim 1, wherein the solderable element includes an element selected from the group consisting of: tin, silver, zinc, copper, magnesium, palladium, and nickel.

3. The method of claim 1, wherein the applying step is conducted via a printing process.

4. The method of claim 1, wherein the applying step is performed within a vacuum chamber or in an inert gas atmosphere.

5. The method of claim 1, wherein the ink includes a flux material adapted to minimize the formation of an oxide layer on the aluminum substrate or adapted to break down an existing oxide layer on the aluminum substrate during melting.

6. The method of claim 1, wherein the solderable element facilitates soldering of the solderable aluminum contact with a solderable material.

7. A method of forming a joint between an aluminum contact and a second substrate, comprising:
    formulating an ink that includes a solderable element that is conductive;
    applying the ink to an aluminum substrate to form an ink layer on a surface of the aluminum substrate;
    melting the ink layer with an energetic beam to form a joint contact area including an alloy on the surface of the aluminum substrate, the alloy including the solderable element, a beam power of the energetic beam is selected to burn away a thermoplastic material within the ink and break down an oxide layer on the aluminum substrate such that the oxide layer is no longer a macroscopically continuous layer;
    roughening the joint contact area after the formation of the alloy;
    cutting the aluminum substrate and the alloy including the roughened joint contact area to form a contact;
    applying a conductive adhesive or a solder paste to the joint contact area of the contact;
    placing the second substrate on the conductive adhesive or the solder paste; and
    heating the conductive adhesive or the solder paste to form the joint between the aluminum contact and the second substrate.

8. The method of claim 7, wherein the solderable element includes an element selected from the group consisting of: tin, silver, zinc, copper, magnesium, palladium, and nickel.

9. The method of claim 7, wherein the applying step is conducted via a printing process.

10. The method of claim 7, wherein the second substrate includes one of: copper, aluminum, tin, gold, nickel plated copper, silver plated copper, a silver plated polymeric material, a gold plated polymeric material, and a combination thereof.

11. The method of claim 7, wherein the conductive adhesive is selected from the group consisting of: epoxy, cyanoacrylate, polyurethane, acrylic, or silicone with filler materials including silver, tin, copper, gold, nickel, or a combination thereof.

12. The method of claim 7, wherein the solder paste is selected from the group consisting of: SnPb, SnSb, SnBi, SnCuAg, SnCuNi, SnCu, SnAg, SnZn, SnAgPb, SnAgSb, SnIn, AuGe, and AuIn.

13. The method of claim 7, wherein the joint is a fluxless joint.

14. The method of claim 7, wherein a joint resistance between the alloy and the second substrate is at least 75 percent less than a joint resistance between a pristine aluminum and the second substrate.

15. The method of claim 7, wherein the step of roughening the joint contact area comprises melting the alloy via an energetic beam.

16. The method of claim 1, wherein a voltage-penetration depth of the energetic beam is adjusted according to the equation:

$$6.7 \times 10^{-7} \times \frac{V^{5/3}[V]}{\rho[g/cc]}$$

wherein V is voltage and ρ is density of the ink layer.

17. The method of claim 1, further comprising the steps of:
    mechanically removing oxidation from the aluminum substrate prior to the step of applying the ink; and
    roughening the alloy on the surface of the aluminum substrate prior to the step of cutting of the aluminum substrate.

18. A method of producing a solderable aluminum contact, comprising:
    formulating an ink that includes a solderable element that is conductive;
    applying the ink to an aluminum substrate to form an ink layer on a surface of the aluminum substrate;
    melting the ink layer with an energetic beam to form an alloy on the surface of the aluminum substrate including the solderable element, a voltage-penetration depth of the energetic beam is adjusted according to the equation:

$$6.7 \times 10^{-7} \times \frac{V^{5/3}[V]}{\rho[g/cc]}$$

wherein V is voltage and ρ is density of the ink layer; and
cutting the aluminum substrate and the alloy into a plurality of individual contacts.

\* \* \* \* \*